United States Patent [19]

Knutson

[11] 3,734,819

[45] May 22, 1973

[54] ETHYLENE-VINYL ACETATE EMULSION ADHESIVE

[75] Inventor: Gaylen M. Knutson, Yorba Linda, Calif.

[73] Assignee: Union Oil Company of California, Los Angeles, Calif.

[22] Filed: Feb. 14, 1972

[21] Appl. No.: 226,256

Related U.S. Application Data

[63] Continuation-in-part of Ser. No. 50,880, June 29, 1970, abandoned.

[52] U.S. Cl. ............... 161/254, 156/328, 156/332, 161/251, 260/17 A, 260/17.4 ST, 260/29.6 WA, 260/29.6 WB, 260/87.3, 260/878 R
[51] Int. Cl. ....................... C08f 37/00, C09j 3/14
[58] Field of Search ............ 260/29.6 WA, 29.6 WB, 260/17.4 ST, 79.3 M, 17 A, 8, 29.6 TA; 161/254

[56] References Cited

UNITED STATES PATENTS

| | | | |
|---|---|---|---|
| 2,300,920 | 11/1942 | Heuer | 260/29.65 Q |
| 2,859,191 | 11/1958 | Turnbull | 260/29.6 |
| 3,010,929 | 11/1961 | Jones | 260/29.6 |
| 3,265,654 | 8/1966 | Glabisch et al. | 260/29.6 |
| 3,320,199 | 5/1967 | Brezinski et al. | 260/29.6 |
| 3,334,081 | 8/1967 | Madgwick et al. | 260/94.9 |
| 3,355,322 | 11/1967 | Worrall et al. | 117/126 |

FOREIGN PATENTS OR APPLICATIONS 1,117,711   6/1968   Great Britain

*Primary Examiner*—William H. Short
*Assistant Examiner*—E. Nielsen
*Attorney*—Milton W. Lee, Richard C. Hartman, and Lannas S. Henderson et al.

[57] ABSTRACT

A process for the production of an aqueous emulsion of an ethylene-vinyl acetate polymer is disclosed wherein the polymerization is performed in the presence of a heel, a small amount of a vinyl or $C_3$ to $C_{12}$ vinylalkylene, vinylcycloalkylene or vinylarylene sulfonic acid or the sodium, potassium, lithium or ammonium salt thereof and a minor amount of a polyvinyl alcohol protective colloid. The heel is an aqueous emulsion of an ethylene vinyl-acetate polymer which contains from 1 to 20 weight percent ethylene and a small amount of polyvinyl alcohol colloid. The polymerization is performed under an ethylene pressure of 100 to 1,000 psig., sufficient to incorporate from 1 to 20 weight percent ethylene into the final polymer product and carried out until the total free monomer content of the emulsion is maintained below about 1 weight percent. Conventional free radical initiation of the polymerization reaction is used. The resultant emulsion can be used as an adhesive since films formed therefrom exhibit a high degree of adhesiveness to vinyl surfaces.

13 Claims, No Drawings

ETHYLENE-VINYL ACETATE EMULSION ADHESIVE

RELATED APPLICATIONS

This application is a continuation-in-part of application Ser. No. 50,880 filed June 29, 1970, now abandoned.

DESCRIPTION OF THE INVENTION

This invention relates to an improved adhesive composition and method for making the same. More particularly, this invention relates to an adhesive composition having improved adhesion to vinyl plastics and to a method of making the same.

Recent commercial applications of adhesives have increased the demand for adhesives having quite selective properties. To mention a few of these properties, many applications new require adhesives which are moisture resistant or non-flammable, or that have a low biological toxicity, or do not crystallize and become brittle with time, or that can be applied at ambient temperature.

A particularly desirable property which has heretofore been difficult to obtain with conventional adhesives is a good adhesion to vinyl plastics. The development of adhesives having this property has attracted considerable attention because of the ubiquity of vinyl plastics such as polyvinyl chloride or polyvinyl acetate.

Many common adhesives possess some of the above desired properties but are lacking in others. For example, proteinaceous adhesives have good adhesion and can be applied at ambient temperatures but are highly susceptible to moisture, and thus are inadequate in a moist environment. Another common adhesive is a solution of polyacrylates in an organic solvent; however, this adhesive is usually flammable and toxic and exhibits a detrimental effect on plastics by causing swelling or solvation. Another adhesive which has good moisture resistance and low flammability is an ethylene-vinyl acetate copolymer which commonly has a relatively high ethylene content and consequently requires heating to melt the resin before its application to the desired surfaces. Many surfaces, however, such as paper products and some plastics can not be heated sufficiently without partial or total destruction of the product or surface. Attempts to emulsify these ethylene-vinyl acetate copolymers and thereby provide an ambient temperature adhesive have been unsuccessful because of the resulting low cohesiveness of the adhesive.

Recently, an emulsion of a vinyl acetate copolymer with a low ethylene content and a polyvinyl alcohol protective colloid has been introduced into the adhesives market. This emulsion is suitable for many purposes, however, films from the emulsion lack adequate adhesion to vinyl plastics. A need, therefore, still exists for an adhesive that is moisture resistant, inflammable, easy to apply at ambient temperatures and easy and inexpensive to manufacture. The adhesive should also have low biological toxicity, good adhesion to vinyl plastics and should not cause swelling or solvation of plastic products.

Accordingly, an object of this invention is to provide an improved adhesive as an aqueous emulsion.

Another object of this invention is to provide an ethylene-vinyl acetate emulsion having improved adhesion.

Another object of this invention is to provide an emulsion adhesive that can be applied at ambient temperatures and that has an excellent adhesion to vinyl plastics.

Another object of this invention is to provide a method of producing an ethylene-vinyl acetate emulsion adhesive.

A further object of this invention is to provide an improved method of making an ethylene-vinyl acetate emulsion adhesive having improved adhesion to vinyl plastics.

Other objects and advantages of this invention will be apparent to those skilled in the art from the description thereof which follows.

The aforesaid objects and their attendant advantages can be attained with an aqueous ethylene-vinyl acetate emulsion having a low ethylene content and formed by polymerizing ethylene and vinyl acetate in the presence of a small amount of a sulfonic comonomer. This monomer consists of a vinyl or a $C_3$ to $C_{12}$ vinyl alkylene, vinylcycloalkylene or vinylarylene sulfonic acid or the ammonium, sodium, potassium or lithium salts thereof. Examples of these compounds include, among others, vinylbenzenesulfonic acid, allylsulfonic acid, vinylsulfonic acid, alpha-methallylsulfonic acid, vinylnaphthalenesulfonic acid, allylxylenesulfonic acid, vinylcyclohexanesulfonic acid, vinylcyclopentanesulfonic acid, sodium vinylbenzenesulfonate, potassium allylsulfonate, sodium vinylsulfonate, ammonium vinylsulfonate, potassium vinylsulfonate, lithium vinylsulfonate, lithium vinylbenzenesulfonate, ammonium vinylbenzenesulfonate, sodium vinylnaphthalenesulfonate, sodium vinylcyclohexanesulfonate, sodium allylxylenesulfonate, vinylhexanesulfonic acid, vinylheptanesulfonic acid, vinyloctanesulfonic acid, vinyl-4-methylhexanesulfonic acid, sodium vinylhexanesulfonate, potassium vinyloctanesulfonate, ammonium vinyl-4-isopropylhexanesulfonate, etc.

The preferred adhesive emulsions are formed by the polymerization of ethylene and vinyl acetate in the presence of vinyl sulfonic acid or the ammonium or alkali metal salts thereof. The sodium vinyl sulfonate monomer is the most preferred because it imparts to the resulting copolymer a high degree of adhesion to vinyl plastics.

While the manner in which the sulfonic comonomer functions is not known with certainty, it is known that the addition of this compound to the ethylene-vinyl acetate emulsion improves the stability of the polymer and also unexpectedly increases the adhesive strength. The maximum benefit from the sulfonic comonomer is attained when the amount of sulfonic comonomer based on the weight of polymer is from 0.001 to about 2.5 weight percent and preferably between 0.05 and 1.5 weight percent. Adhesives having excellent vinyl adhesion can be obtained with an ethylene-vinyl acetate polymer containing from 0.15 to 1.0 weight percent of the sulfonic comonomer based on the weight of polymer.

It is desirable that the emulsion adhesive have a solids content between about 25 and 70 weight percent and preferably between about 35 and 65 weight percent in order to realize an emulsion having the desired viscosity. Emulsions having a solids content below 25 weight percent have too low of a viscosity for most commercial applications, while emulsions having a solids content greater than 70 weight percent tend to form separate phases upon standing and usually require application to the surfaces as a hot melt.

The solids content of the emulsion is basically a measure of the polymer concentration, however, other solid additives may also be present in the emulsion. Generally the polymer content of the emulsion varies from about 25 to 65 weight percent and preferably between about 30 and 60 weight percent of the adhesive. The remaining component is an aqueous liquid such as water.

The polymer is formed from the polymerization of ethylene, vinyl acetate and sulfonic comonomer with the amount of ethylene in the polymer being maintained from about 1 to 20 weight percent, preferably between about 5 and 17 weight percent and, more preferably, between 7 and 18 weight percent of the polymer component. The amount of ethylene in the polymer can be selected by controlling the process conditions during the polymerization reaction, such as the total pressure, the ethylene partial pressure, the temperature, the vinyl acetate addition rate to the reactor or the amount of polymerization catalyst employed. The low ethylene content allows the adhesive composition to be formed in a stable emulsion so that it can be applied to various surfaces at low or ambient temperature. Ethylene contents above 20 weight percent are undesirable for emulsion applications as described in this invention since such polymers generally have too low a molecular weight and form adhesives having a low cohesive strength. The cohesive strength is a measure of the polymer strength and a low strength connotes that only a small force is necessary to cleave the polymer. When a high vinyl adhesion is desired, the ethylene content should be maintained between about 6 and 17 weight percent and preferably between 8 and 17 weight percent of the polymer.

The adhesiveness of the product can be improved by incorporating into the emulsion a minor amount of a protective colloid. A wide range of compounds is available for use as a protective colloid, including many natural substances, such as casein, various natural gums, gelatins, agar, dextrine and globulin; suitable chemically modified polysaccharides such as hydrolyzed starch, hydroxyethyl cellulose, methyl cellulose, carboxymethyl cellulose and synthetic protective colloids such as polyvinyl alcohol. Polyvinyl alcohol is particularly suitable and can be partially or fully hydrolyzed polyvinyl alcohol that has been prepared by the hydrolysis of a vinyl acetate homopolymer. The polyvinyl alcohol component has been found to impart a substantial improvement in adhesion of films formed from the emulsion to vinyl plastics.

The maximum degree of adhesion of such films to vinyl plastics is achieved when the emulsion contains between about 1 and 5 weight percent of polyvinyl alcohol. The degree of hydrolysis of the polyvinyl alcohol significantly affects the adhesiveness of the copolymer at elevated temperatures. Maximum adhesion at elevated temperatures is achieved by use of fully hydrolyzed polyvinyl alcohol. The most effective of the fully hydrolyzed polyvinyl alcohols are those which when dissolved in water at 4 weight percent concentration exhibit a viscosity from 5 to 125 centipoises at 20°C. as determined by the Hoeppler falling ball method. Exemplary of the fully hydrolyzed polyvinyl alcohol components are Gohsenol NL05, a low molecular weight fully hydrolyzed polyvinyl alcohol marketed by Bently Chemical Corporation and Elvanol 70-05, a low molecular weight, fully hydrolyzed polyvinyl alcohol marketed by E. I. duPont de Nemours.

In addition to the fully hydrolyzed polyvinyl alcohol, other protective colloids can also be present in the emulsion without affecting the excellent adhesion of the copolymer for vinyl plastics at elevated temperatures. The presence of a second colloid can, in many instances, be advantageous since it can impart desired properties to the emulsion such as moisture resistance, emulsion stability, etc. Generally good results can be obtained when 1 to 20 parts by weight of a second protective colloid is employed along with each 10 parts of fully hydrolyzed polyvinyl alcohol. In a preferred embodiment, the second protective colloid is a partially hydrolyzed polyvinyl alcohol which is 60 to 95 percent, preferably 85 to 90 percent hydrolyzed, and has a viscosity between about 3 and 45 centipoises as determined by the Hoeppler falling ball method for a 4 percent aqueous solution at 20°C. Exemplary of the partially hydrolyzed polyvinyl alcohol component is Elvanol 51-05, a low molecular weight, 87–89 percent hydrolyzed polyvinyl alcohol, and Elvanol 52-22, an intermediate molecular weight, 87–89 percent hydrolyzed polyvinyl alcohol marketed by E. I. duPont de Nemours.

The total amount of protective colloid or colloids in an emulsion, if more than one is employed, is maintained between about 0.1 and 5 weight percent based on the total emulsion weight. Good results can be obtained with a total protective colloid content between about 0.5 and 4.5 weight percent, and excellent vinyl adhesion properties can be obtained using between 1 and 4 weight percent.

In addition to the protective colloid, other additives may be included within the emulsion without substantially effecting its adhesive properties. One such additive is an emulsifying agent which may be employed to improve the emulsion's stability and is especially advantageous when a high copolymer content is employed. The emulsifying agents can be nonionic, cationic or anionic, however, the anionic and nonionic agents are preferred.

The concentration range of the total amount of emulsifying agents useful in the adhesive can be from 0.01 to 5 weight percent of the emulsion. It is recognized that the inclusion of emulsifying agents is not critical to the invention and they can be entirely eliminated.

In the following discussion of emulsifying agents, frequent reference will be made to the cloud point of a particular agent. The cloud points which are recited are based on 1 weight percent aqueous solutions of the agent. A relatively hydrophobic agent is one having a cloud point below 190°F. and a relatively hydrophilic agent is one having a cloud point of 190°F. or above.

A single emulsifying agent can be used or the emulsifying agents can be used in combination. When combinations of emulsifying agents are used, it is advantageous to use a relatively hydrophobic emulsifying agent in combination with a relatively hydrophobic agent.

Suitable nonionic emulsifying agents include polyoxy-ethylene condensates represented by the following general formula:

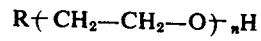

where R is the residue of a fatty alcohol, acid, amide, or amine having from 10 to 18 carbon atoms or an alkyl phenol having from 10 to 18 carbon atoms; and where $n$ is an integer of 1 or above and preferably between 5 and 30. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene amine and the like; and polyoxyethylene thioethers such as polyoxyethylene n-dodecyl thioether.

Some examples of nonionic emulsifying agents which can be used include a polyoxyethylene nonylphenyl ether having a cloud point of between 126° and 133°F. and marketed under the trademark "Igepal CO-630", and a polyoxyethylene nonylphenol ether having a cloud point above 212°F. and marketed under the trademark "Igepal CO-887". A similar polyoxyethylene nonylphenyl ether having a cloud point of about 86°F. is marketed under the trademark "Igepal CO-610" and is also a good emulsifying agent. Another agent is a polyoxyethylene octylphenyl ether having a cloud point of between 80°F. and 160°F. and marketed under the trademark "Triton X-100". Other emulsifying agents include a polyoxyethylene oleyl ether having a cloud point of between 80°F. and 160°F. and marketed under the trademark "Atlas G-3915", and a polyoxyethylene lauryl ether having a cloud point above 190°F. and marketed under the trademark "Brij 35".

The nonionic emulsifying agents which can be used according to this invention also include a series of surface active agents known as "Pluronics". The Pluronics have the general formula:

$$HO(C_2H_4)_a(C_3H_6O)_b(C_2H_4O)_cH$$

where $a$, $b$ and $c$ are integers between 1 and about 100. As the ratio of $b$ to $a$ and $c$ increases, the compounds become less water soluble or more oil soluble and thus more hydrophobic, while as the ratio decreases the compounds become more water soluble and less oil soluble. An example of this class is Pluronic L-64 which has a cloud point of about 140°F. and a polyoxypropylene chain having a molecular weight of 1,500 to 1,800 and a polyoxyethylene content that is 40 to 50 percent of the total weight of the molecule. Another useful example is Pluronic F-68, a polyoxyethylene-polyoxypropylene glycol having a cloud point of about 212°F. and a polyoxyethylene content of about 80 to 90 percent of the total weight of the molecule.

A class of highly suitable emulsifying agents are a series of ethylene oxide adducts of acetylenic glycols sold commercially under the name "Surfynols". This class of compounds can be represented by the formula:

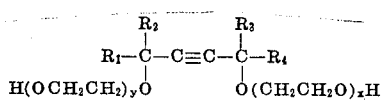

in which $R_1$ and $R_2$ are alkyl radicals containing from three to 10 carbon atoms, $R_2$ and $R_3$ are selected from the group consisting of methyl and ethyl, and $x$ and $y$ are integers having a sum in the range of 3 to 60, inclusive.

Representative of the Surfynols are Surfynol 465 which is an ethylene oxide adduct of 2,4,7,9-tetramethyl decynediol containing an average of 10 moles of ethylene oxide per mole of the surface active agent. Surfynol 485 corresponds to Surfynol 465 but contains an average of 30 moles of ethylene oxide per mole of surface active agent. Surfynol 485 has a cloud point above 212°F.

Anionic emulsifying agents which can be employed herein include anionic compounds obtained by sulfonation of fatty derivatives such as sulfonated tallow, sulfonated vegetable oils and sulfonated marine animal oils. Commercially available emulsifiers of this group are Tallosan RC, a sulfonated tallow marketed by General Dyestuff Corp; Acidolate, a sulfonated oil marketed by White Laboratories, Inc.; and Chemoil 412, a sulfonated castor oil marketed by Standard Chemical Co.

Various sulfonated and sulfated fatty acid esters of mono- and polyvalent alcohols are also suitable such as Nopco 2272R, a sulfated butyl ester of a fatty ester marketed by Nopco Chemical Company; Nopco 1471, a sulfated vegetable oil marketed by Nopco Chemical Company; Sandozol N, a sulfated fatty ester marketed by Sandoz, Inc.; and Stantex 322, an ester sulfate marketed by Standard Chemical Products, Inc.

Sulfated and sulfonated fatty alcohols are also useful as an emulsifier and include anionic agents such as Duponal ME, a sodium lauryl sulfate, Duponal L142, a sodium cetyl sulfate, Duponal LS, a sodium oleyl sulfate which is marketed by E. I. duPont de Nemours and Co.; and Tergitol 4, a sodium sulfate derivative of 7-ethyl-2-methyl, 4-undecanol, Tergitol 7, a sodium sulfate derivative of 3,9-diethyl tridecanol-6 and Tergitol 08, a sodium sulfate derivative of 2-ethyl-1-hexanol, which are marketed by Union Carbide Corp., Chemical Division.

Preferred anionic emulsifiers are the alkyl esters of the alkali metal salts of sulfosuccinic acid. Exemplary emulsifiers include Disodium N-octadecyl sulfosuccinamate marketed under the trademark AEROSOL 18; the disodium ethoxylated alcohol half esters of sulfosuccinic acid marketed under the trademark AEROSOL A-101, A-102, and A-103; the diamyl ester of sodium sulfosuccinic acid marketed under the trademark AEROSOL AY; the diisobutyl, dioctyl and dihexyl ester of sodium sulfosuccinic acid marketed under the respective trademarks AEROSOL IB, AEROSOL GPG, OT and OT-B and AEROSOL MA; and the bis(-tridecyl)ester of sodium sulfosuccinic acid marketed under the trademark AEROSOL TR. The aerosol emulsifiers are marketed by the American Cyanamid Co., Industrial Chemicals and Plastics Division.

Cationic emulsifiers can also be employed and include various amines such as Ethoquad C/12, Ethoquad O/25, Ethoquad 18/12 which are polyethoxylated quaternary ammonium salts marketed by Armour Industrial Chemical Company; Indulin W-1, a lignin derivative marketed by West Virginia Pulp and Paper Co.; Katapol VP-532 and Katapol PN-430 which are polyoxyethylated alkylamines marketed by General Aniline and Film Corp.; Romine O, an oleyl imidazoline marketed by Rozilda Laboratories, Inc.; Triton X-400, a steryl-dimethylbenzyl ammonium chloride marketed by Rohm and Haas Co.; Variquat 638, K300 and L200 which are ethoxylated quaternary, dicoco dimethyl ammonium chloride and alkenyl trimethyl ammonium chloride, respectively, and marketed by Varney Chemical Corp.; and Amine C, O, S, and T which are heterocyclic tertiary amines marketed by Geigy Industrial Chemicals.

Another additive which can be included within the emulsion adhesive is a plasticizer. The plasticizer does not substantially effect the adhesive properties of the emulsion and it can be employed in an amount from 0.01 to 10 percent of the total emulsion weight to impart a desired surface property to the adhesive. For example, in one aspect a plasticizer can increase the tackiness of adhesives obtained from the final emulsion product. Suitable plasticizers which may be employed herein include phthalate esters, such as, diethyl phthalate, di-2-ethylhexyl phthalate, di-capryl phthalate, di-lauryl phthalate, methyl-cyclohexyl phthalate, dimethoxyethyl phthalate, di-butoxy ethyl phthalate, etc.; phosphoric acid derivatives, such as, trichlorethyl phosphate, tributyl phosphate, tri-2-ethylhexyl phosphate, tributylglycol phosphate, etc.; glycol derivatives, such as, polyethylene glycol 200-400 marketed by Carbide and Carbon Chemicals Corp., triethyl citrate, acetyl triethyl citrate, butyl phthalyl butyl glycollate, dibutyloxalate, diamyloxalate, methyl-cyclohexonol oxalate, etc.; esters of adipic and sebacic acids, such as, dioctyl adipate, citratoxy ethyl adipate, di-hexyl sebacate, etc.; esters of abietic and ricinoleic acids, such as, methyl dihydroabietate, ethylene glycol diabietate, glyceryl monoricinoleate, ethyl glycol mono-methyl ether acetyl ricinoleate, etc.; and toluene sulfonic acid derivatives, such as, o- and p-toluene sulfonamide, p-toluene sulfanilide, etc.

Other types of plasticizers which can be employed herein include chlorinated diphenyls such as Aroclor 1242 and extender type plasticizers such as the substituted biphenyls marketed by Monsanto Chemical Co. under the trademark HB-40 and HB-20.

The following table briefly summarizes the components of the emulsion adhesive of this invention which can be employed. The content ranges are expressed in weight percent of the product emulsion except as otherwise indicated.

TABLE 1

Adhesive Composition

| Component | Broad | preferred | Most Preferred |
|---|---|---|---|
| Polymer | 25-65 | 30-60 | 35-60 |
| Ethylene Content[1] | 1-20 | 5-17 | 7-16 |
| Vinyl Sulfonate Monomer[2] | 0.05-2.5 | 0.05-1.0 | 0.15-0.75 |
| Protective Colloid | 0.1-5 | 0.5-4.5 | 1-4 |
| Emulsifier | 0.01-5 | 0.1-2 | 0.1-1 |
| Plasticizer | 0.01-10 | 0.1-5 | 0.5-3 |
| Water | 75-30 | 70-35 | 65-35 |

[1] Ethylene content of polymer
[2] Monomer content of polymer

The polymerization is initiated by a water soluble free radical initiator such as a water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as alkali metal metabisulfites and pyrosulfites such as sodium metabisulfite, potassium metabisulfite, sodium pyrosulfite, etc. A particularly preferred reducing agent is sodium or potassium formaldehyde sulfoxylate such as Formopon marketed by Rohm and Haas Co. The presence of the reducing agent in the polymerization medium achieves a release of free radicals at a lower temperature than necessary in its absence and thereby promotes formation of higher molecular weight copolymer products. The amount of reducing agent which can be employed throughout the copolymerization generally varies from about 0.1 to 3 weight percent of the amount of polymer, however, in a preferred embodiment, the reducing agent is only employed to initiate the reaction and hence is necessary only in small amounts which is generally between about 0.001 to 0.02 weight percent of polymer produced.

Various emulsion polymerization techniques can be employed to obtain the desired polymer, however, it is preferred to conduct the polymerization reaction in a batch process using a kettle, and a stirrer to maintain intimate admixing of the liquid reactants. The polymerization is started by charging water to the vessel along with an effective amount of a buffering agent to maintain the solution pH during polymerization between about 9 and 3 and preferably between about 8 and 4. When redox agents and emulsifying agents are employed, they can be charged into the reactor in the necessary quantities.

The reactor can be purged several times with an inert gas such as nitrogen to evacuate all of the oxygen which may be present in the gas phase and thereafter purged with ethylene to obtain a relatively pure ethylene content in the gas phase at a pressure of from about 100 to 1,000 psig, and preferably from about 200 to 600 psig. It is recognized, however, that the presence of inert gases in the reactor does not render the invention inoperable, and that the polymerization reaction may proceed even though the ethylene in the gas phase is diluted with inert vapors. After the reactor is purged it can be then charged with the protective colloid, plasticizer, vinyl acetate monomer and sulfonic comonomer and agitated to form an aqueous emulsion. The amount of vinyl acetate charged to the reactor generally ranges from 25 to 65 weight percent of the emulsion, preferably between 30 and 60 weight percent, and the amount of sulfonic comonomer charged to the reactor generally ranges from 0.01 to 2.5 weight percent and preferably between 0.1 and 0.85 weight percent of the emulsion. The catalyst is charged to the reactor in an amount effective for polymerization and the reactor is heated to a temperature from 100° to 180°F. and preferably between 110° and 145°F. to initiate the reaction. The catalyst and reactant are stirred sufficiently to thoroughly agitate the contents of the reactor and to maintain the solids emulsified in the aqueous solution. After initiation of the reaction, the temperature of the emulsion is maintained between 160° and 185°F. and preferably between about 170° and 180°F. by forcing a cooling liquid through the cooling jackets of the reactor.

In a preferred embodiment of the polymerization process, a heel is charged to the reactor before the addition of the monomers and emulsified in the aqueous solution. The heel is an ethylene-vinyl acetate copolymer emulsion and can comprise a portion of the previous emulsion adhesive batch or alternatively can be an aqueous ethylene-vinyl acetate emulsion having a low ethylene content; generally below 20 weight percent ethylene in the copolymer and, preferably, between 5 and 17 weight percent. A particularly preferred heel is an aqueous ethylene-vinyl acetate copolymer emulsion containing 1 to 5 weight percent and preferably 1 to 3 weight percent of polyvinyl alcohol and having a solids content of about 40 to 60 weight percent. An exemplary heel is Aircoflex 400 marketed by Airco Chemical Co. and is an aqueous emulsion of an ethylene-vinyl acetate copolymer with an ethylene content of between about 10 and 15 weight percent and between 1.5 and 2.5 weight percent of a polyvinyl alcohol colloid with a solids content of about 55 weight percent. The viscosity of the emulsion is about 1,100 to 1,500 centipoises as measured by a Brookfield Viscometer, Model LUF at 60 rpm and at 77°F.

The amount of heel charged to the reactor can vary over a wide range depending upon the reaction conditions and selected emulsion contents. Generally the amount of heel ranges between 1 and 40 weight percent and preferably between about 5 and 30 weight percent of the final emulsion product. It has been found, for example, that an improved adhesive having excellent vinyl adhesion can be prepared when a heel of from 10 to 20 weight percent is employed.

If a heel is employed, the amount of vinyl acetate and sulfonic comonomer charged to the reactor is proportionately decreased. Thus, if a 10 percent heel is employed, the amount of comonomers employed is reduced by 10 weight percent. The following Table II illustrates the amount of monomer which can be employed in the practice of this invention for various ranges of heel charged to the reactor. All values in the table are given as weight percent of the emulsion.

TABLE 2

| Heel | Broad | | Preferred | |
|---|---|---|---|---|
| | Vinyl Acetate | Sulfonic comonomer | Vinyl Acetate | Sulfonic Comonomer |
| 1-40 | 25-65 | 0.01-1.3 | 30-65 | 0.1-0.75 |
| 5-30 | 20-60 | 0.01-1.2 | 25-60 | 0.1-0.7 |
| 10-20 | 15-55 | 0.01-1.1 | 20-55 | 0.1-0.6 |

In a particularly preferred embodiment of the above polymerization procedure, the solids content in the reactor after the addition of the heel to the aqueous solution is adjusted to between 15 and 30 weight percent prior to the addition of catalyst and other monomers. Also, the catalyst, vinyl acetate, plasticizer and protective colloid are concurrently introduced into the reactor at slow addition rates, i.e., between about seven-eighths and one-fourth of the total amounts of each additive is charged to the reactor until all of the catalyst, vinyl acetate, plasticizer and colloid is charged into the reactor.

The polymerization reaction is conducted until the total free monomer content, i.e., the amount of unreacted free vinyl acetate and sulfonic comonomer in the emulsion, is less than 1 weight percent of the emulsion and preferably less than 0.6 weight percent. In the event that the total free monomer content is higher than the above concentrations after a sufficient reaction period such as 4 hours, an additional amount of catalyst can be charged to the reactor to reduce the monomer content or, alternatively, the reaction temperature can be increased. The reactor is then cooled and depressured and the excess ethylene gas in the emulsion is removed. In instances where large batches of the emulsion adhesive is employed, it may be advantageous to introduce a defoaming agent into the emulsion during the degassing procedure to prevent a large froth or foam from developing on the emulsion surface.

Numerous buffering agents can be employed in the above mentioned polymerization reaction and can generally comprise any water soluble additive capable of reducing the pH of water to the desired level while being relatively inert to the polymerization reaction. Exemplary buffer agents include diammonium orthophosphate, tetrasodium pyrophosphate, sodium acetate, potassium acetate, etc. Alkali metal carbonates and bicarbonates, such as sodium carbonate, sodium bicarbonate, potassium carbonate, potassium bicarbonate, etc., can also be employed.

The adhesive compositions made by the practice of this invention have particular utility in the adhesion of vinyl plastics to solid substrates or other vinyl plastics. The adhesive latex is applied to a surface of the vinyl plastic or a conjunctive surface of a solid substrate and the treated surface or surfaces are pressed together so that the latex is contiguous to both surfaces. The latex is allowed to cure for a sufficient period, such as, from 1 to 48 hours to form a laminated structure or article. Thus the adhesive latex of this invention can be used to form laminated articles comprising sheets of vinyl plastics or sheets of vinyl plastics and other solid substrates or alternatively, the adhesive latex can be used to adhere irregular shaped vinyl plastics, such as, tubes, etc., to solid structures. The amount of adhesive latex which is necessary in order to obtain the desired bond with the vinyl plastic varies greatly and depends upon the type and surface of the plastic employed as well as the necessary adhesive strength required. Generally, however, it is desired that the amount of latex employed will be sufficient to deposit a layer of adhesive which is from 1 to 50 mils and preferably from 4 to 20 mils in thickness.

The vinyl plastic which can be effectively employed herein, includes polyvinyl chloride, polyvinyl dichloride, polyvinyl fluoride, polyvinyl formal, polyvinylidene chloride, polyvinyl butyral, polystyrene, etc. and copolymers thereof and especially copolymers of polyvinyl chloride. Exemplary vinyl plastics which can be effectively employed herein include, SEILON CR100, and SEILON HI4000, a polyvinyl chloride marketed by Seilon Inc., TEDLAR 15 and TEDLAR 25, a polyvinyl fluoride marketed by DuPont de Nemours, and SEILON 3400 a polystyrene marketed by Seilon Inc.

The adhesive latex can be successfully applied to any solid substrate, such as, wood, glass, concrete, metals, synthetic resins, etc., or any conventional support structure. The surface of the substrate can be relatively rough, smooth or highly polished, however, the adhesion will be better if the substrate surface is slightly rough. Thus in one embodiment of this invention, the adhesive latex can be employed to adhere a polyvinyl chloride sheet to a wooden or metal surface.

The invention is further illustrated by the following examples which are illustrative of specific embodiments of this invention and which are not intended as limiting the scope of the invention as defined by the appended claims.

Examples 1 – 8

In these examples, a series of tests are described which illustrate the effectiveness of sodium vinyl sulfonate in improving the adhesive properties of an ethylene-vinyl acetate copolymer emulsion. In each test a 1 gallon stainless steel pressure reactor equipped with a cooling jacket and a stirrer is charged with 346 grams of water and 3.8 grams of sodium bicarbonate and stirred at ambient temperatures until all of the bicarbonate is dissolved in the water phase. The reactor is then charged with 197 grams of Aircoflex 400 and the contents are stirred at 300 rpm for approximately 30 minutes at ambient temperature. Oxygen is removed from the reactor by purging it twice with 100 psig nitrogen and three times with 100 psig ethylene. The reactor is then pressured to 400 psig with ethylene and the stirring rate is increased to 500–700 rpm. The contents are heated to 135°F. and an aqueous initiator solution comprising an admixture of ( 1 ) 630 grams of water, (2) 8 grams of potassium persulfate, (3) varying amounts of sodium vinyl sulfonate is charged to the reactor. After 48 grams of initiator solution has been charged to the reactor, the vinyl acetate monomer (1031 grams) is injected into the emulsified mixture at an injection rate of about 20 grams per minute. The temperature is allowed to increase to 175°F. as regulated by controlling the flow through the cooling jacket and the ethylene pressure is controlled at approximately 600 psig throughout the reaction. When the addition of all of the ingredients is complete, the residual free monomer content in the emulsion is determined every half hour until it is less than about 0.6 percent. The reactor is then depressurized and cooled to ambient temperature.

A small sample of the emulsion is analyzed for its ethylene content and subjected to a hot vinyl adhesion test. In the adhesion test a small amount of the emulsion is applied at ambient temperatures to one side of a 1-inch wide strip of unsupported plasticized polyvinylchloride sheet (6 mils thick) and the strip is pressed against a piece of plywood. The amount of adhesive employed is sufficient to obtain a 4 mil thick film of adhesive between the polyvinylchloride sheet and the plywood. The sample is cured at room temperature for a minimum period of 16 hours and thereafter is heated in an oven at 130° to 140°F. for 5 minutes. A strip of the vinyl film is initially peeled from the plywood for a distance of about one-fourth inch and a 13.4 gram weight is hung on the peeled end of the hot vinyl strip. The sample is hung in a vertical position so that the attached weight will continue to peel the strip of vinyl from its plywood base. The time required to peel the vinyl strip 5.0 inches is selected to represent the strength time and the hot strength is calculated by multiplying the weight in grams of the attached weight by the time, in minutes, required to peel the strip 5 inches. The hot strength for various samples is determined and reported in TABLE III.

TABLE III

| Example | Ethylene[1] weight percent | SVS,[2] weight percent | Polyvinyl alcohol | | | Hot strength, grams/ minutes |
|---|---|---|---|---|---|---|
| | | | Weight percent | Trademark | Supplier | |
| 1 | 14.2 | 0 | 1.9 | Elvanol 51-05 | DuPont de Nemours | 13.4 |
| | | | 0.8 | Elvanol 52 22 | | |
| 2 | 14.7 | 0.50 | 1.7 | Elvanol 70-05 | do | 820 |
| | | | 1.0 | Elvanol 52-22 | | |
| 3 | 11.9 | 0 | 4.0 | Cohsenol AHIT[3] | Bently Chemical Co | 34 |
| 4 | 11.5 | 0.25 | 4.0 | Elvanol 70-05 | DuPont de Nemours | 443 |
| 5 | 11.1 | 0.50 | 4.0 | do | do | 470 |
| 6 | 14.3 | 0 | 2.7 | do | do | 73 |
| 7 | 14.1 | 0.50 | 2.8 | do | do | 456 |
| 8 | 10.7 | 0.75 | 3.0 | do | do | 200 |

[1] Weight percent of ethylene in the polymer.
[2] Sodium vinyl sulfonate.
[3] A fully hydrolyzed polyvinyl alcohol marketed by Bently Chemical Company.

It is apparent from the above table that the addition of sodium vinyl sulfonate to the emulsion adhesive increases the hot strength from 13.4 grams-minutes in Example 1 to 820 gram-minutes in Example 2; also in Examples 3 and 4 or 5 a similar increase is shown; and in Examples 6 and 7 an increase from 73 to 456 is demonstrated. The table also shows that superior hot strength is obtained with sulfonate concentrates of 0.25 and 0.5 weight percent and that the hot strength decreases at sulfonate concentrations of 0.75 weight percent.

Examples 9–15

These examples demonstrate the improvement in vinyl hot strength by the addition of fully hydrolyzed (98–100 percent hydrolyzed) polyvinyl alcohol to the ethylene-vinyl acetate emulsion adhesive. Several adhesive compositions are prepared in accordance with the procedure set forth in Examples 1–8 with varying amounts and types of hydrolyzed polyvinyl alcohol. The adhesive compositions are then subjected to the hot vinyl adhesion test as described in Examples 1–8 and the hot strength is reported in the following TABLE IV.

TABLE IV

| Example | Ethylene,[1] weight percent | SVS,[2] weight percent | Weight percent | Percent hydrolyzed | Trademark | Hot strength, grams/ minutes |
|---|---|---|---|---|---|---|
| 9 | 14.1 | 0.50 | 2.8 | Fully | Elvanol 70-05 | 456 |
| 10 | 13.9 | 0.50 | 2.1 | Fully | Elvanol 70-05 | 725 |
| | | | 0.7 | 87-89 | Elvanol 51-05 | 725 |
| 11 | 12.5 | 0.50 | 1.4 | Fully | Elvanol 70-05 | 640 |
| | | | 1.4 | 87-89 | Elvanol 51-05 | 640 |
| 12 | 6.9 | 0.50 | 2.1 | Fully | Elvanol 70-05 | 536 |
| | | | 0.7 | 87-89 | Elvanol 51-05 | 536 |
| 13 | 11.8 | 0.50 | 1.4 | 87-89 | Elvanol 51-05 | 187 |
| | | | 1.4 | 87-89 | Elvanol 52-22 | 187 |

TABLE IV —Continued

| Example | Ethylene,[1] weight percent | SVS,[2] weight percent | Weight percent | Percent hydrolyzed | Trademark | Hot strength, grams/ minutes |
|---|---|---|---|---|---|---|
| 14 | 11.0 | 0.50 | 1.4 | 87-89 | Elvanol 51-05 | 142 |
|    |      |      | 1.4 | 87-89 | Elvanol 52-22 | 142 |
| 15 | 7.4  | 0.50 | 1.4 | 87-89 | Elvanol 51-05 | 241 |
|    |      |      | 1.4 | 87-89 | Elvanol 52-22 | 241 |

[1] Weight percent of ethylene in the polymer.
[2] Sodium vinyl sulfonate.

In the above Table, Examples 9–13 demonstrate that fully hydrolyzed polyvinyl alcohol improves the vinyl hot strength of the adhesive. The effect of fully hydrolyzed polyvinyl alcohol on the adhesive hot strength is clearly shown by a comparison of Examples 11 and 13 and Examples 12 and 15 wherein the addition of the fully hydrolyzed alcohol to the emulsion increased hot strength by 2 to 4 fold.

Examples 16–22

The following examples are presented to illustrate the effect of the ethylene content of the ethylene-vinyl acetate copolymer on the adhesive properties of the emulsion. Several compositions are prepared in accordance with the procedure set forth in Examples 1–8 with varying ethylene contents in the adhesive. The vinyl hot strength of the adhesive is measured and reported in the following TABLE V.

TABLE V

| Ex. | Ethylene[1] Wt. % | SVS[2] (Wt. %) | Polyvinyl Alcohol Wt. % | Trademark | Hot Strength Grams/Minutes |
|---|---|---|---|---|---|
| 16 | 20.5 | 0.25 | 1.7 | Elvanol 70-05 | 168 |
|    |      |      | 1.0 | Elvanol 51-05 |     |
| 17[3] | 17.9 | 0.25 | 1.7 | Elvanol 70-05 | 214 |
|    |      |      | 1.0 | Elvanol 51-05 |     |
| 18[3] | 15.3 | 0.25 | 1.7 | Elvanol 70-05 | 400 |
|    |      |      | 1.0 | Elvanol 51-05 |     |
| 19 | 16.4 | 0.25 | 2.7 | Elvanol 70-05 | 430 |
| 20 | 12.6 | 0.25 | 2.7 | Elvanol 70-05 | 362 |
| 21 | 17.1 | 0.25 | 4.0 | Elvanol 70-05 | 174 |
| 22 | 10.8 | 0.25 | 4.0 | Elvanol 70-05 | 671 |

[1] Weight percent of ethylene in the polymer.
[2] Sodium vinyl sulfonate.
[3] A 20 percent heel of Aircoflex 400 is employed.

It is apparent from the above Table that the adhesive emulsions having an ethylene content of 17.1 or greater (Examples 16, 17 and 21) result in a composition having insufficient hot strength, less than about 280 gram-minutes. Examples 18–20 and 22, on the other hand, demonstrate that adhesives having an ethylene content between 10.8 and 16.4 exhibit superior hot strength.

Examples 23–26

These examples are presented to demonstrate the improvement in vinyl hot strength by the employment of a 20 weight percent heel of Aircoflex 400. Several adhesive compositions are prepared in accordance with the procedure set forth in Examples 1–8 with varying amounts of the Aircoflex 400 heel. The hot strength of the adhesives is measured and reported in the following TABLE VI.

TABLE VI

| Ex. | Ethylene[1] (Wt. %) | Heel[2] (Wt. %) | SVS[3] (Wt. %) | Wt.% | Trademark | Hot Strength Grams/Minutes |
|---|---|---|---|---|---|---|
| 23 | 12.2 | 10 | 0.25 | 4.0 | Elvanol 70-05 | 282 |
| 24 | 12.2 | 20 | 0.25 | 4.0 | Elvanol 70-05 | 1150 |
| 25 | 9.4  | 10 | 0.25 | 4.0 | Elvanol 70-05 | 255 |
| 26 | 9.8  | 20 | 0.25 | 4.0 | Elvanol 70-05 | 2120 |

[1] Weight percent of ethylene in the polymer.
[2] Weight percent of Aircoflex 400 in the emulsion.
[3] Sodium vinyl sulfonate.

It is clearly apparent from the above table that an increase in heel from 10 weight percent to 20 weight percent substantially increased the hot strength of the ethylene-vinyl acetate emulsion adhesive.

Example 27

This example demonstrates a preferred procedure for making a superior ethylene-vinyl acetate adhesive. In this procedure, 1,147 gallons of an adhesive having superior vinyl hot strength is produced by charging a 1,250 gallon pressure reactor equipped with a jacket for heating and cooling the reactor contents with 585 pounds of water, 15 pounds of sodium bicarbonate and 0.7 pound of Formopon, a sodium sulfoxylate formaldehyde complex manufactured by Rohm and Haas Co. The contents are stirred at 150 revolutions per minute until all of the solids are dissolved. The reactor is then charged with 1,553 pounds of a heel of a vinyl acetate-ethylene copolymer emulsion having about 55 percent solids and an additional 549 pounds of water to flush any residual heel from the transfer lines.

After these ingredients are charged into the reactor, 401 pounds of vinyl acetate is pumped into the reactor and the admixture is stirred at 150 revolutions per minute and pressured to 20 psig with nitrogen. Oxygen is removed from the reactor by pressuring it twice with nitrogen at 100 psig and three times with ethylene at 100 psig and exhausting it to atmospheric pressure between the pressuring cycles. After approximately 30 minutes, an 8 ounce sample is taken from the reactor and analyzed for its solids content. If the solids content is greater than 28.3 percent, water is added, and if the solids content is less than 27.3 percent, more of the heel is added to the reactor to maintain the solids content of the emulsion within a range of 27.3 to 28.3 weight percent.

When the desired solids content is attained, the gas in the reactor is evacuated down to 24 inches of mercury and ethylene is added to increase the pressure to 400 psig. The reactor is heated to 135°F. and stirred at 150 revolutions per minute. Thereafter, 6 gallons of an aqueous solution containing 2.73 weight percent potassium persulfate and 10 gallons of a polyvinyl alcohol solution are slowly charged into the reactor. The polyvinyl alcohol solution is prepared by admixing 140 pounds of Elvanol 70-05 and 215.6 gallons of water in a holding vessel equipped with a jacket for heating and cooling of the vessel. The contents of the vessel are vigorously agitated and heated to 170°–190°F. for 2 hours. The solution is then rapidly cooled to ambient temperature by circulating a cooling fluid through the vessel jacket and 63 pounds of sodium vinyl sulfonate is dispersed throughout the solution.

After the persulfate and polyvinyl alcohol solution has been charged into the reactor, the temperature of its contents is allowed to rise to 175°F. and the contents are thereafter maintained at that temperature by circulating a cooling water through the reactor jacket. The ethylene pressure is maintained at 540–550 psig throughout the reaction and 3,720 pounds of vinyl acetate are charged into the reactor at a rate of approximately 2.3 gallons per minute. Simultaneously, therewith, 71 gallons of an aqueous 2.73 weight percent potassium persulfate solution are charged into the reactor at a rate of 0.34 gallon per minute, and 210 gallons of the polyvinyl alcohol solution, described above, are charged into the reactor at a rate of 0.95 gallon per minute. These ingredients are charged continuously into the reactor and stirred therein at 150 revolutions per minute. The persulfate addition rate should be adjusted so as to maintain about 3 percent total free monomer content in the emulsion as determined by bromine titration during the addition. The reaction conditions are maintained until the free monomer content of the emulsion is less than 0.6 weight percent. If a stable monomer content above 0.6 weight percent persists, more persulfate solution can be added to reduce the monomer content below 0.6 weight percent. The reactor is then depressurized and cooled to ambient temperature. The depressurizing is continued with constant stirring until all of the residual ethylene gas is removed as determined by bromine titration. To aid in degassing, 1.7 pounds of a defoamer (Colloids 680) is added to the emulsion. The solids in the emulsion is adjusted to 55 weight percent by adjusting the water content and the emulsion is removed from the reactor and placed in storage. The ethylene-vinyl acetate emulsion readily forms adhesives having superior vinyl adhesion properties.

Example 28

Several adhesive compositions are prepared in substantially the same procedure as disclosed in Example 31 except in 1 gallon quantities. The ethylene content is varied from 8 to 16 weight percent, other strength imparting monomers are substituted for the sodium vinyl sulfonate, a plasticizer and an emulsifying agent are employed and are added to the reactor with the Aircoflex 400 heel, and the amount of polyvinyl alcohol colloid is varied. These adhesives are presented in the following TABLE VII and have good adhesive properties.

the invention include the reagents and steps and their obvious equivalents set forth in the following claims.

I claim:

1. A process for the production of a polymer emulsion which comprises:

emulsifying in an aqueous medium having a pH of about 3 to 9 the following ingredients: (1) between about 1 and 40 weight percent of a heel comprising an aqueous emulsion containing between about 40 and 60 weight percent solids comprising an ethylene-vinyl acetate copolymer containing between about 1 and 20 weight percent ethylene; (2) between about 25 and 65 weight percent of vinyl acetate; (3) between about 0.1 and 5 weight percent of a protective colloid; and (4) between about 0.01 and 1.3 weight percent of a sulfonic comonomer selected from the group consisting of vinyl and $C_3$ to $C_{12}$ vinylalkylene, vinylcycloalkylene and vinylarylene sulfonic acids and the sodium, potassium, lithium or ammonium salts thereof;

contacting said emulsified mixture with a water soluble free radical polymerization initiator and ethylene at a pressure of about 100 to 1,000 psig and a temperature of about 160° to 185°F.;

agitating said mixture and activating said initiator to polymerize said ethylene, vinyl acetate and sulfonic comonomer until the free monomer content of said emulsion is reduced to less than about 1 weight percent.

2. The process defined in claim 1 wherein said sulfonic comonomer is the sodium, potassium or ammonium salt of vinyl sulfonic acid.

3. The process defined in claim 1 wherein said protective colloid is selected from the class consisting of hydrolyzed starch, hydroxyethyl cellulose, carboxymethyl cellulose and polyvinyl alcohol.

4. The process as defined in claim 1 wherein said protective colloid is fully hydrolyzed polyvinyl alcohol.

5. The process defined in claim 4 wherein said polymerization catalyst is potassium persulfate.

6. The process defined in claim 1 wherein said heel comprises an aqueous emulsion containing about 55 weight percent of solids and comprising between about 1.5 and 2.5 weight percent of polyvinyl alcohol and an ethylene-vinyl acetate copolymer containing between

TABLE VII

| | Experimental compositions | | | | | | | | | |
|---|---|---|---|---|---|---|---|---|---|---|
| | 1 | 2 | 3 | 4 | 5 | 6 | 7 | 8 | 9 | 10 |
| Emulsion composition: | | | | | | | | | | |
| Polymer component (weight percent) | 53 | 51 | 51 | 55 | 45 | 51 | 50 | 36 | 62 | 52 |
| Ethylene (weight percent)[1] | 8 | 12 | 12 | 12 | 10 | 10 | 10 | 10 | 10 | 16 |
| Sodium vinyl sulfonate (weight percent)[1] | | | 0.2 | 0.1 | 0.1 | 0.2 | 0.2 | 0.2 | 0.2 | |
| Potassium vinyl sulfonate (weight percent)[1] | | 0.2 | | | 0.1 | | | | | 0.2 |
| Vinyl benzene sulfonic acid (weight percent)[1] | 0.2 | | | | | | | | | |
| Protective colloid: | | | | | | | | | | |
| Elvanol 70–05 (weight percent) | 1.5 | 2 | 2 | | | 4 | | | 1.0 | |
| Elvanol 51–05 | | 1 | 1 | | 2 | | | | | |
| Elvanol 52–22 | | | | | | | | | | |
| Carboxymethyl cellulose (weight percent) | | | | 3 | 1 | 3 | | 2 | | 1.0 |
| Plasticizer: | | | | | | | | | | |
| Di-butoxyethyl phthalate (weight percent) | 0.5 | | | | | 1 | | 1 | | |
| p-Toluene sulfonamide (weight percent) | | | | 0.5 | | | | 0.5 | | |
| Emulsifier: | | | | | | | | | | |
| Igepal Co–630 (weight percent) | | | | | 1 | | | | | 1.0 |
| Pluronic L–64 (weight percent) | | | | 1 | | | 1 | | | |
| Surfynol 485 (weight percent) | | | | | | | | | 2 | 1.0 |
| Solids content (weight percent) | 55 | 55 | 55 | 60 | 50 | 55 | 55 | 40 | 65 | 55 |

[1] Weight percent of polymer component.

The preceding examples are presented solely to illustrate the preferred mode of practice of the invention and to demonstrate results attained therewith. It is not intended that these examples be construed as unduly limiting of the invention but instead it is intended that about 10 and 15 weight percent ethylene.

7. The process defined in claim 1 wherein between about 0.01 and 10 weight percent of a plasticizer is also emulsified in said aqueous medium.

8. The process defined in claim 1 wherein between about 0.01 and 5 weight percent of an emulsifying agent is also emulsified in said aqueous medium.

9. A process for the production of an emulsion adhesive which comprises:

emulsifying in an aqueous medium having a pH of about 4 to 8 the following components: (1) between about 10 and 20 weight percent of a heel comprising an aqueous emulsion having a viscosity of about 1,100 to 1,600 centipoises at 77°C. and containing about 50 and 60 weight percent of an ethylene-vinyl acetate copolymer having from about 10 to 15 weight percent ethylene and also containing about 1.5 to 2.5 weight percent of polyvinyl alcohol; (2) between about 20 and 55 weight percent vinyl acetate; and (3) between about 0.1 and 0.6 weight percent sodium vinyl sulfonate;

contacting the emulsified mixture with between about 1 and 4 weight percent of fully hydrolyzed polyvinyl alcohol, between about 0.1 and 3 weight percent of potassium persulfate and ethylene at a pressure of between 200 and 600 psig and a temperature between about 170° and 180°F.; and agitating said mixture and activating said initiator to polymerize said ethylene, vinyl acetate and sodium vinyl sulfonate until the amount of unreacted vinyl acetate and sodium vinyl sulfonate in the emulsion is reduced to less than 0.6 weight percent.

10. The process defined in claim 9 wherein about 0.001 to 0.2 weight percent of potassium formaldehyde sulfoxylate is also emulsified in said aqueous medium.

11. The product produced by the method of claim 1.

12. An article of manufacture comprising a substrate having a solid surface, a vinyl plastic having a surface conjunctive with the solid surface of said substrate and adhered thereto by an adhesive interlayer formed from an adhesive emulsion prepared by the method of claim 1.

13. The article in claim 12 wherein said vinyl plastic is polyvinyl chloride.

* * * * *